United States Patent Office 3,449,449
Patented June 10, 1969

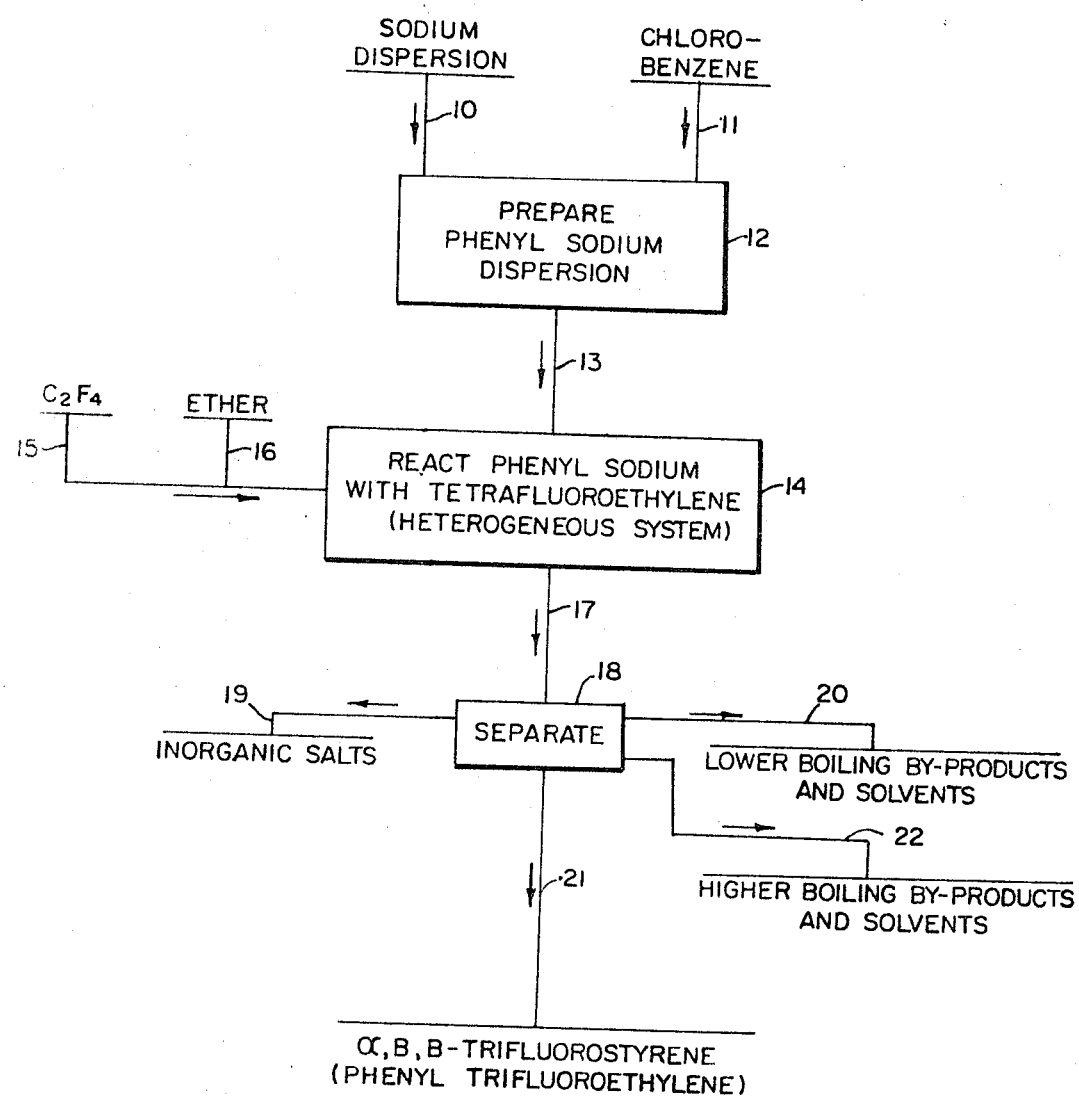

3,449,449
MANUFACTURE OF TRIFLUOROSTYRENE
Larry D. Nichols, Boston, and Arthur S. Obermayer, Cambridge, Mass., and Manuel Panar, Wilmington, Del., assignors to Moleculon Research Corporation, Cambridge, Mass., a corporation of Massachusetts
Filed Mar. 25, 1965, Ser. No. 442,584
Int. Cl. C07c *17/32*
U.S. Cl. 260—651                2 Claims

ABSTRACT OF THE DISCLOSURE

Disclosed is a process for making trifluorostyrene (or phenyl trifluoroethylene) by the reaction of solid phenyl sodium with tetrafluoroethylene in a heterogeneous liquid-solid system containing a solvent for the tetrafluoroethylene. This process is applicable to the preparation of related fluorine-containing unsaturated compounds from other aryl sodium and gem-difluoroethylene compounds.

---

This invention is a process for the manufacture of $\alpha,\beta,\beta$-trifluorostyrene and similar fluorine-containing unsaturated and polymerizable compounds.

Trifluorostyrene, which may also be called phenyl trifluoroethylene, is a known compound useful as an intermediate and as a polymerizable monomer. With free radical or anionic catalysts it can be polymerized readily to polytrifluorostyrene (see U.S. Patent No. 2,651,627), films of which are used as ion-permeable membranes in hydrogen-oxygen fuel cells.

Trifluorostyrene has been prepared previously by three distinct methods: See U.S. Patents 2,612,528, 2,752,400 (and also 2,651,627) and 2,874,166 (and also 2,874,197). These three methods suffer from very low yields. The reported yield for each of these processes is only about 21%, 7% and 30% respectively. The first method is based on the fluorination and dehalogenation of difluorochloro acetophenone and has many steps and uses expensive reagents. The second method involves the reaction of benzene in a hot tube with chlorotrifluoroethylene and would have commercial utility if higher yields could be achieved. The third method utilizes the reaction of an ether solution of phenyl lithium in a homogeneous system with tetrafluoroethylene and is limited in its commercial utility because of its low yields, the high cost of phenyl lithium and the difficulty of separating the product from the dissolved salts.

The present invention is based on the finding that trifluorostyrene can be prepared in high yields by the reaction of solid phenyl sodium with tetrafluoroethylene in a heterogeneous liquid-solid system. Yields exceeding 60 weight percent based on 100 percent pure tetrafluoroethylene are readily achieved and yields in excess of 75 weight percent are usual, as determined by vapor phase chromatography. This heterogeneous reaction system can also be used to prepare related fluorine-containing unsaturated compounds from other aryl sodium and gem-difluoroethylene compounds, as the skilled-in-the-art will appreciate.

A surprising feature of the present process is that the phenyl sodium, which is much more reactive than phenyl lithium, gives better yields. Normally, one would expect to produce more by-product, such as difluorostilbene, with the more reactive material. In this connection, it has been noted in the literature the phenyl lithium tends to mono-metallize any given molecule, whereas phenyl sodium tends to di-metallize. This does not seem to be the case however in the present process. See: Organic Reactions, vol. VIII, page 283, Adams et al., John Wiley & Sons, Inc., New York, N.Y., 1962 (Library of Congress Card No. 42-20265).

In brief compass, therefore, the present invention is a process for preparing $\alpha,\beta,\beta$-trifluorostyrene by reacting in a heterogeneous liquid-solid system tetrafluoroethylene with particulated solid phenyl sodium, which is preferably dispersed in an inert liquid organic solvent, the reaction being carried out at a temperature preferably in the range of $-30°$ C. to $-100°$ C. and preferably under super-atmospheric pressure, followed by separating the trifluorostyrene from the reaction products. The reaction is carried out under conditions of good shearing agitation and it is preferred that a second organic solvent be present that will remove from the reaction phase the waste inorganic salts that are produced.

The drawing attached to and forming part of the specification schematically illustrates one process embodying the principles of this invention.

Referring to the drawing, the first step of the process comprises preparing the solid finely-divided phenyl sodium. This is done in a straight forward manner by the reaction of finely divided sodium with chlorobenzene, supplied by lines 10 and 11 respectively. The sodium is preferably carried in a heavy inert oil such as kerosene. The reaction is carried out in zone 12 with good shearing agitation at a temperature in the range of 32–37° C. The sodium dispersion is first added and should be freshly prepared and of less than 10 micron average particle size to ensure good reactivity. Approximately a stoichiometric amount of the chlorobenzene is then slowly added in a controlled manner to prevent the creation of a potentially explosive mixture. Close to 100% yields are obtained. The amount of kerosene used is preferably sufficient to give a heavy but free flowing slurry.

Phenyl sodium is a pyrophoric solid and should not be exposed to the atmosphere. It can be separated from the inert oil under an inert atmosphere as by filtering, washing with a light volatile solvent and drying, if it is to be added to the next step as a dry powder. It is usually more convenient however to pass the oil-phenyl sodium dispersion directly to the next step by line 13.

The tetrafluoroethylene is first supplied by line 15 to zone 14 and can be dissolved in an inert solvent, such as ether supplied by line 16, in order to reduce its vapor pressure. The phenyl sodium dispersion is then transferred slowly by line 13 to zone 14 where it is reacted with the tetrafluoroethylene. Good agitation and good heat transfer are required to maintain the reaction at the desired temperature and pressure.

The concentration of the tetrafluoroethylene, the phenyl sodium particle size, the extent of agitation and the nature of the solvent are all important in determining yield. In order to achieve a high yield it is necessary that the concentration of tetrafluoroethylene be maximized and the concentration of the product trifluorostyrene be minimized in the boundary layer between the solvent and the solid phenyl sodium. This maximization of the tetrafluoroethylene and minimization of the trifluorostyrene can be achieved by:

(1) Using a high pressure and low temperature to maximize the tetrafluoroethylene solubility in the solvent.

(2) Rapid agitation of the boundary layer to replenish it with fresh tetrafluoroethylene and to remove the trifluorostyrene.

(3) Removing trifluorostyrene from the bulk of the solution as soon as possible after it is formed.

(4) Rapid removal of the sodium chloride and sodium fluoride salts formed in the boundary layer region. This can be accomplished by the use of a secondary solvent, such as ether, in which the inorganic salts have a limited solubility but which is less reactive towards phenyl sodium than is tetrafluoroethylene.

The pressures used can range from 10 p.s.i.a. to 200 p.s.i.a. or more, e.q. 35 p.s.i.a. The temperature is preferably in the range of −30° C. to −100° C. e.g. −55° C. The higher the pressure the higher the reaction temperature that can be used. The reaction is so rapid that the temperature has little effect on the reaction rate, although there is some indication that it may affect yields. Generally speaking, the reaction temperature is determined by the heat transfer efficiency of the system, the amount of solvent present and the desired operating pressure.

It is also desirable to ensure that an inert atmosphere is maintained in the reaction zone and to this end nitrogen, argon, neon and similar gases can be introduced at the beginning of a reaction to purge the reactor.

Care must be taken to prevent polymerization of the product as the trifluorostyrene will polymerize in the presence of an anionic polymerization catalyst and the phenyl sodium will serve as such a catalyst. It appears that the concentration of the trifluorostyrene will build up to a maximum and if it continues to be formed the trifluorostyrene is removed from the system either in the form of a polymer or as by-product by reason of further reaction with the phenyl sodium. If good yields are to be obtained, it is desirable therefore in a batch system to terminate the reaction by ceasing the addition of the reactants slightly before this point of maximum concentration is reached. In a continuous system it is desirable to remove a portion of the reactants and products and to add fresh reactants at such a rate to avoid any substantial polymer formation. In the process illustrated in the drawing, the reactor is charged with the desired amount of the tetrafluoroethylene, e.g. 2 lb. per gallon of reactor volume, and the phenyl sodium is then added until there remains a 50 to 500% tetrafluoroethylene excess, e.g., 200%, at which point the reaction mixture is dumped.

The reaction mixture is transferred by line 17 to separation zone 18 where the by-products and wastes can be separated by any one of several methods. It is convenient to decant or filter liquid from the solid material and then to vacuum distill off the remaining components. The inorganic salts are removed by line 19, low boiling solvents and by-products by line 20, the trifluorostyrene by line 21 and the high boiling solvents and by-products, principally cis- and trans-difluorostilbene, by line 22.

Other aryl metal derivatives that can be used in the place of the phenyl sodium have a formula of R—Na, wherein R is selected for example from the group consisting of alkyl and fluoro substituted phenyl, pyridyl, naphthyl, alkyl and benzyl radicals. The metal atom is preferably directly attached to an aromatic nucleus. It is essential of course that the compound R—Na exist as a solid under the conditions of the reaction.

Other gem-difluoroethylene derivatives that can be used have the formula $R=CF_2$ wherein R for exacple is selected from the group consisting of CFI, $CF_3CF$, $C_6H_5CF$, CFCl, and $CF_2=CFCF$. The compound $R=CF_2$ should be capable of existing as a gas, liquid or solute under the conditions of the reaction so that it will be available in molecular form.

Examples of inert dispersants that can be used to prepare the phenyl sodium and in the phenyl sodium tetrafluoroethylene reaction are the commonly known oils, e.g. aliphatic and/or aromatic petroleum distillates, benzene, propane, butane, iso-butane, pentane and the like.

Materials equivalent to the ether of the above example that are not unduly reactive with the phenyl sodium and help to remove the salt reaction products from the system are relatively inert polar solvents such as 1,1,1 trifluoroethane, dimethyl ether, dipropyl ether, diisopropyl ether and the like.

Having described this invention, what is sought to be protected by Letters Patent is succinctly set forth in the following claims:

1. A process comprising reacting in a heterogeneous system tetrafluoroethylene with a particulated solid phenyl sodium dispersed in an inert liquid hydrocarbon, the reaction being carried out under good shearing agitation, at superatmospheric pressure and at a temperature in the range of −30° to −100° C.

2. The process of claim 1 in the further presence of a solvent selected from the group consisting of ethyl ether, 1,1,1 trifluoroethane, dimethyl ether, dipropyl ether and diisopropyl ether.

References Cited

UNITED STATES PATENTS 2,874,166 2/1959 Dixon.
2,874,197 2/1959 Dixon.

OTHER REFERENCES

Dixon III, Jour. of Org. Chem., 1956, pp. 400–403.
Miardichian, Org. Synthesis, Reinhold Pub. Corp., New York, 1957, pp. 735, 740.

LEON ZITVER, *Primary Examiner.*

H. T. MARS, *Assistant Examiner.*

U.S. Cl. X.R.

260—649, 665